United States Patent [19]
Ekstrom et al.

[11] 3,822,696
[45] July 9, 1974

[54] ELECTROCARDIOGRAPHY ST ANALYZER AND METHOD

[75] Inventors: Philip A. Ekstrom, Seattle, Wash.;
Ronald R. Taylor, Torrance, Calif.

[73] Assignee: The Battelle Development Corporation, Columbus, Ohio

[22] Filed: Sept. 29, 1971

[21] Appl. No.: 184,716

[52] U.S. Cl. ............................................ 128/2.06 A
[51] Int. Cl. ............................................. A61b 5/04
[58] Field of Search...... 128/2.05 R, 2.05 S, 2.06 A, 128/2.06 R

[56] References Cited
UNITED STATES PATENTS

| | | | |
|---|---|---|---|
| 3,267,934 | 8/1966 | Thornton | 128/2.06 A |
| 3,524,440 | 8/1970 | Horth | 128/2.06 A |
| 3,554,187 | 1/1971 | Glassner et al. | 128/2.06 A |

FOREIGN PATENTS OR APPLICATIONS

| | | | |
|---|---|---|---|
| 182,849 | 8/1966 | U.S.S.R. | 128/2.06 A |

Primary Examiner—William E. Kamm
Attorney, Agent, or Firm—Stowell & Stowell

[57] ABSTRACT

In electrocardiology: a method and apparatus for measuring st depression, i.e., st level relative to pg level. The st depression is obtained for each wave by storing the wave in a signal time delay apparatus and measuring the level of the st segment of the wave relative to the pq segment of the delayed copy of the wave.

6 Claims, 5 Drawing Figures

ELECTROCARDIOGRAPHY ST ANALYZER AND METHOD

The invention described herein was made in the course of work under a grant from the Department of Health, Education and Welfare.

This invention relates to electrocardiology and more particularly to a method and apparatus for analyzing specific portions of electrocardiac signals. The invention further relates to means for measuring electrocardiac signals and more particularly to means for obtaining electrocardiac signals and automatically processing the electrocardiac signals to indicate ST depression.

As is well known, the human cardiac muscle produces electrical signals that radiate throughout the body and appear upon the surface of the skin. These electrocardiac signals arise from expansions and contractions of the cardiac muscle. By placing electrodes on a patient's skin, these electrocardiac signals (often termed EKG) may be sensed. Furthermore, by connecting the electrodes with a suitable cathode ray oscilloscope, moving pen recorder, or similar device, the EKG signals may be visually presented for viewing. The EKG signals are often recorded on a paper tape for subsequent study and analysis.

Normally, the EKG signal will include a group of pulses or waves that result from depolarization of the ventricles prior to contraction and are commonly referred to as the QRS complex. Immediately preceding this complex there is normally a small pulse that results from the initiation of the muscular activity and is referred to as the P wave. Following the QRS complex there is normally at least one additional pulse referred to as the T wave and separated from the QRS complex by the so-called st segment. Following the completion of one pumping action and prior to the succeeding pumping action, the cardiac muscle relaxes and the EKG signal will be essentially quiescent with little or no fluctuation in the amplitude thereof.

In a normal healthy heart the pulse rate, the rhythm thereof, the shape of the QRS complex, and the amplitude of the st segment have certain predetermined characteristics and fall within certain limits. However, in the event the cardiac muscle is subject to abnormal strain and/or has one or more infirmities therein, the EKG signal may have one or more differences from a normal EKG signal. For example, the rate and/or rhythm of the heart beat may be erratic and vary throughout wide limits. In addition, both the size, shape and time duration of the QRS complex and the st segment following it may vary substantially from the normal.

At the present time the most common and practical means for determining whether a heart has certain types of abnormalities and the nature thereof has been to obtain an electrocardiogram and to visually study or analyze the electrocardiogram to determine if it is normal or not. Heretofore, this has required the services of a highly skilled electrocardiologist who must expend large quantities of time reviewing the electrocardiogram.

The prior art is aware of (merely by way of example) the following patented art relating to electrocardiac (EKG) analysis. U. S. Pat. No. 3,144,019 to Haber, for a system for monitoring a variety of cardiac arrhythmics; U. S. Pat. No. 3,267,934 to Thornton, for processing electrocardiac signals; U. S. Pat. No. 3,352,330 to Rose, for detecting cardiac arrhythmics be measuring the R portion of each heartwave; U. S. Pat. No. 3,384,075 to Mitchell for measuring and displaying heartbeat rate; U. S. Pat. No. 3,442,264 to Levitt, for processing data derived from heart signals; U. S. Pat. No. 3,413,546 to Riehl et al, for obtaining the quotient of the frequency divided by the voltage of a waveform; U. S. Pat. No. 3,457,452 to Saper, for displaying EKG signal; and U. S. Pat. No. 3,460,527 to Karsh, for detecting QRS widening.

It has been observed that depression of the st segment of the cardiogram recorded while undergoing moderate exercise is predictive of coronary disease. The st and pq portions of the heartwave take place at different regions along the wave and are hence separated in time. In order to observe the difference between these segments, some technique or scheme is requied to store the pq level so that the comparison can take place later, when the st forces occur. No completely satisfactory apparatus exists for this purpose.

From a signal processing viewpoint, the task of obtaining st forces is that of measuring the voltage of the st segment of the electrocardiographic waveform and subtracting from it the voltage of the pq segment. When the waveform obtained is a noisy one, for instance, during strenuous exercise, the value obtained from any single beat may be greatly in error. One must then collect data from many beats and process it so as to reduce the effects of the noise.

Since the undesired noise potentials are not correlated with the desired cardiac ones, standard techniques of signal averaging can be used to recover the desired information. There is, however, a special circumstance which makes their application difficult. The only feature of the waveform prominent enough to allow reliable triggering of an averaging process under noisy conditions is the R wave, particularly its downslope. Unfortunately, the pq segment, one of the two features of interest, occurs before R. One must somehow preserve the information contained in this region of the wave until the R feature occurs and the exact location of the PQ segment can be determined.

In a report by Bruce et al: Quantitation of QRS and ST Segment Responses to Exercise; Am. Heart J., 71: 455-566, 1966. a technique for making the comparison is described. The data was obtained by using a tape recorder with fixed record and playback heads arranged to obtain a delayed copy of the signal to be processed. The PQ segment of the delayed signal occurs after the R portion of the direct signal, permitting triggering for the function of signal averaging. While generally successful, this system required a large investment in equipment, required considerate attention and effort to run, and yielded the desired information only long after the taking of data.

The practice of the present invention permits real-time output of st depression to be obtained. One significant point of departure displayed over the above-described technique is the ability to select the desired waveform features and also select the point at which undesired information is discarded. The practice of the present invention leads to smaller and less costly diagnostic equipment and also to greater facility in signal processing.

According to the techniques of the present invention, an adjustable signal delay or time delay is employed. By this technique, comparison between any selected portion of a single EKG wave or any selected portions of different waves may be obtained.

If the starting points of the pq segment and st segment are separated by a time, alpha, the delay is adjusted to equal alpha. One other time interval is of interest, the separation between the downslope of R and the beginning of the ST segment. This may be called beta. The delayed signal is subtracted from the direct to yield a difference signal which is of interest only during a certain time interval beginning a time beta after the direct signal's R downslope, that is, during the direct signal's st segment. Since the signal delay brings the pq segment of the delayed signal into coincidence with the st segment of the direct signal, the difference signal takes on the value of the desired st depression during this interval. Since the interval occurs after the direct signal's R wave, one may readily generate a delayed trigger to sample it correctly. The rest of the difference waveform may be ignored, in fact, it need actually be formed only during the interval of interest.

If the signals in question are contaminated with noise, as in exercise testing, then the st depression thus obtained will be similarly contaminated. One must then process it further by averaging, etc., to recover the desired information. The crucial feature here is that the processing is done after the data is reduced to a single quantity per beat. This is an improvement by a factor of four hundred over the earlier technique in the amount of data to be handled at this stage. If one wishes to record information beat-by-beat, average it, or generate a sorted array yielding the median, the recording or storage capacity required is reduced by a similiar factor.

IN THE DRAWINGS

Figure 1:
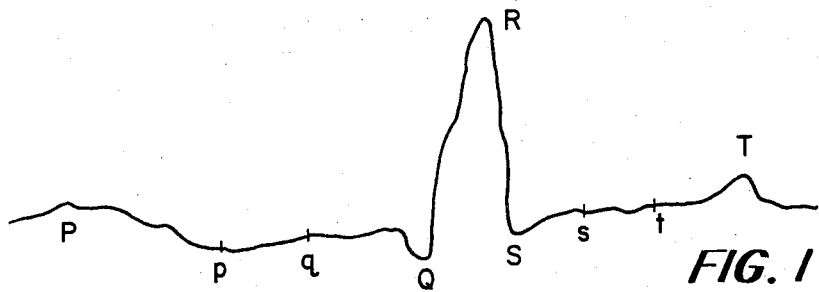
FIG. 1 is a typical EKG plot of a normal adult heart.

Referring now to the drawings, FIG. 1 denotes a typical normal adult electrocardiogram (EKG). This wave includes, in the following sequence, a P wave of positive polarity, a QRS complex consisting of a negative Q wave, a positive R wave and a negative S wave, and finally, a T wave that is separated from the QRS complex by an st segment. Although there may be several additional waves present in a normal EKG signal, since they will have little or no effect on the operation of the present invention, for purposes of simplicity the present description will be confined to waveforms of this general nature.

Normally, the EKG signals will occur periodically at a frequency on the order of about 60 to 80 beats per minute, but under abnormal circumstances the pulse rate may be very erratic and fall to zero or rise to more than two hundred beats per minute. The P wave is normally a small, positive pulse that corresponds to the initial impulse that triggers the commencement of the heartbeat and the resulting reflex expansions and contractions thereof. Immediately following the P wave, there is a quiescent portion of substantially uniform amplitude. Normally, this portion will have a time duration on the order of greater than 0.04 second and will have a constant or fixed amplitude that may be used as an isoelectric signal.

At the conclusion of the isoelectric signal, the QRS complex occurs. This complex precedes the ventricular contraction producing the actual pumping action. The complex commences with a so-called Q wave which is a small negative pulse. The Q wave is succeeded by the R wave, which is the most conspicuous portion of the EKG signal. It comprises a positive pulse having an amplitude greater than any of the other waves present in the EKG signal. Normally, the R wave will have the appearance of a "spike" with a sharp rise and fall and a relatively short duration. More particularly, it is believed that the maximum time duration will normally be on the order of up to 0.03 to 0.04 second. However, certain types of abnormalities such as premature ventricular beats result from an ectopic focus (or foci) of depolarization in the ventricle and may result in an EKG signal characterized by a distortion of the R wave and particularly an increase thereof.

Following the R wave the QRS complex terminates in a negative excursion called the S wave.

Following the QRS complex, there will normally be a T wave which is separated from the S wave by the so-called st segment. The amplitude of this segment will normally be approximately equal to the isoelectric portion between the termination of the P wave and the commencement of the Q wave.

A segment pg is illustrated at the PQ portion, and a portion st is illustrated on portion ST. These portions are arbitrarily chosen.

Figure 2:
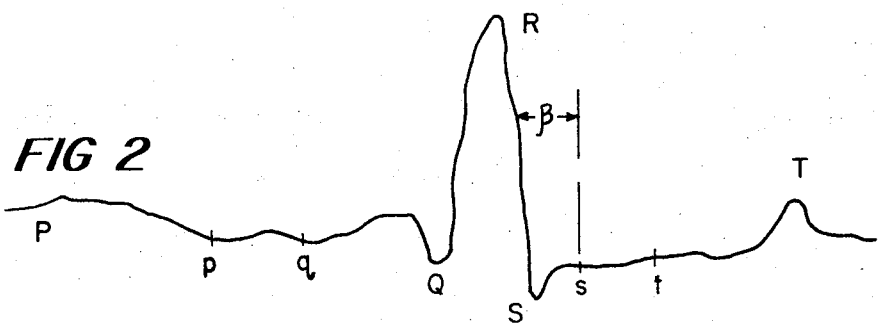
FIG. 2 is a representation similar to FIG. 1, except that the EKG is illustrated as being taken after exercise. The heart may or may not be normal.

At FIG. 2 of the drawings, a similar EKG is shown, but having a depressed st portion. Such EKG patterns have been observed in persons after undergoing exercise and it will be observed that the st portion is depressed relative to its pq portion much more so than is the st portion of the more normal wave of FIG. 1 relative to its pq portion.

Figure 3:
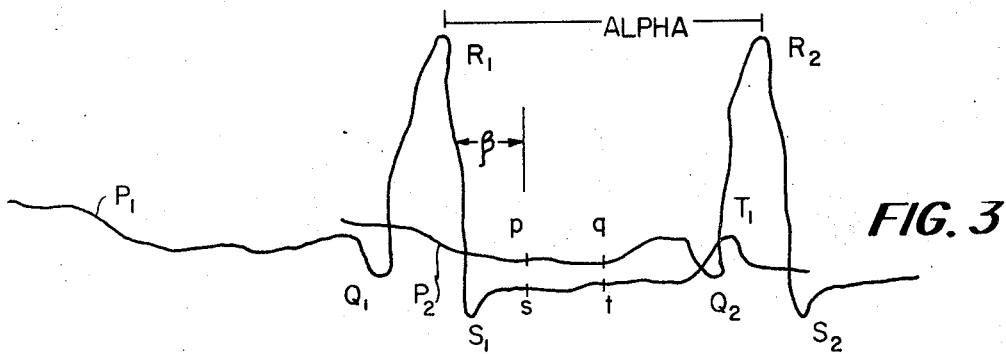
FIG. 3 represents two superimposed EKG patterns of FIG. 2, separated by a time delay alpha.

A variable signal delay is employed, this enabling any given EKG pattern to be effectively superimposed upon itself with any desired time displacement. Referring now to FIG. 3 of the drawings, an EKG denoted as $P_1$ is shifted by a signal dealy, alpha, such that the segments *pg* and *st* effectively overlap. The unshifted EKG is denoted as $P_2$. With such overlapping, the voltage difference between segment *pq* and *st* of the same wave may be measured. The apparatus for carrying out such a process is illustrated schematically at FIG. 4 of the drawings. A more complete schematic circuit is illustrated at FIG. 5 of the drawings.

The beginning of the downslope of the R wave may be employed as a trigger from which to base the time comparisons. Referring to FIG. 2 of the drawings, a time delay, beta, is indicated between the beginning of the downslope of the R wave and the commencement of the arbitrarily chosen st segment. The pg segment of $P_2$ occurs first in real time. $P_1$ is then delayed by an interval of time corresponding to alpha. The st segment occurs later in real time, and is depicted as a part of $P_2$. The portions pq and st are now in coincidence, at the real time of st occurrence. By the use now of the downslope of the R portion as a zero or base point, at a time, beta, therefrom the segments pq and st are measured and compared. The duration of such measuring corresponds to their length (arbitrarily chosen) on the st segment. After this, the same process is carried out for the next EKG wave, and so on.

Figure 4:
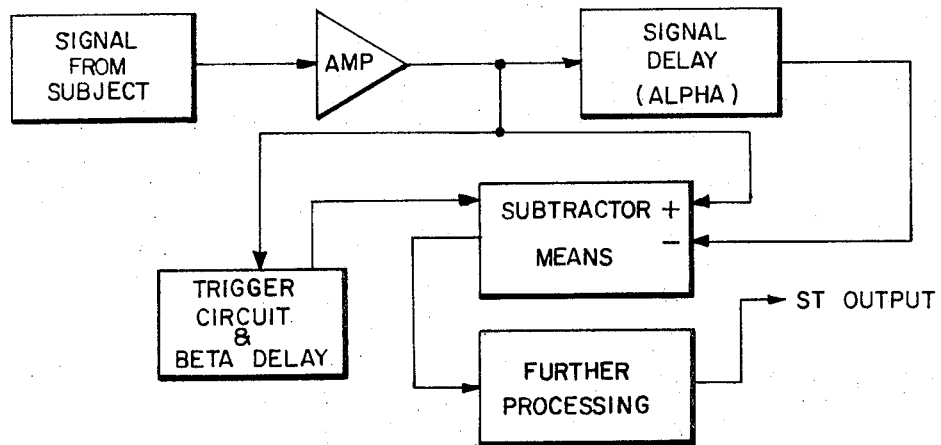
FIG. 4 is a schematic diagram illustrating in functional form the elements of an apparatus for the practice of this invention.
Figure 5:
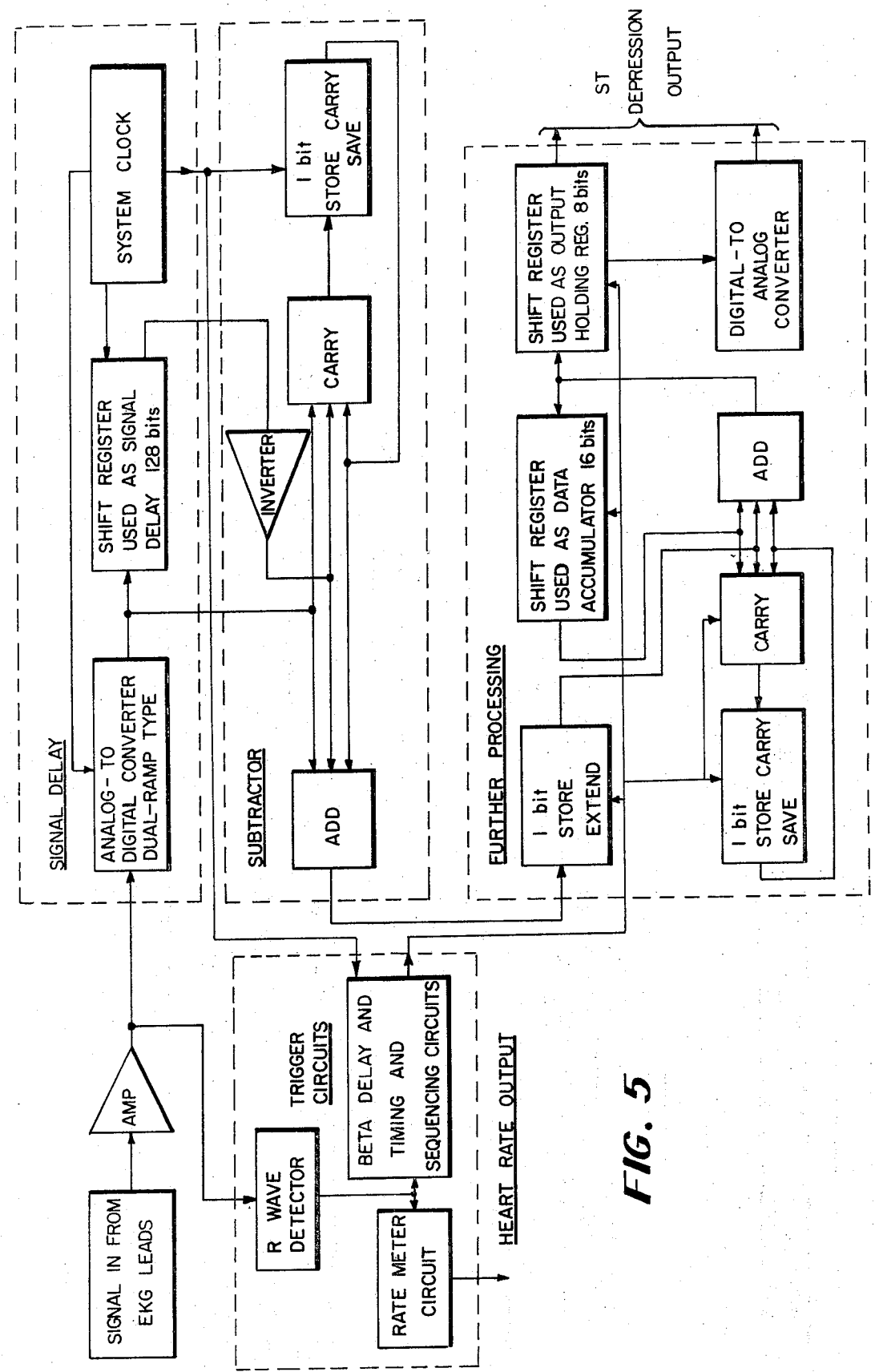
FIG. 5 is a view similar to FIG. 4, showing greater detail.

Referring now to FIG. 4 of the drawings, the EKG signals from the subject are initially amplified. A portion of these amplified signals is then fed to a signal delay (storage) means for effecting a delay corresponding to time delay, alpha. Another portion of the amplified EKG signals is fed to both a subtractor means and a trigger circuit means. At the subtractor, the delayed (corresponding to $P_1$) and the direct (corresponding to $P_2$) signals are compared and subtracted. The trigger circuit initiates the operation of the subtractor means at the time corresponding to time delay, beta. Thus, the subtractor means does not commence the comparison until the end of the time corresponding to beta. A predetermined time after the end of beta, the subtractor means is operable and compares its inputs. At the end of this predetermined period (corresponding to the length of st) the subtractor means is no longer operative until the next EKG pattern. The output from the subtractor means may be coupled to the trigger circuit means as indicated and initiates the processing of the results. The particular statistical treatment of the raw data, i.e., the further processing of successive st-pq differences by averaging, taking the median or variance, etc., may be done in a variety of ways, known to workers in this art, and forms no part of this invention.

It will be understood that the EKG signals from the subject may be initially modulated or converted to digital form and given any other treatment before being fed to the amplifier and to the remainder of the circuit elements illustrated at FIG. 4.

Referring now to FIG. 5 of the drawings, a more detailed schematic or block diagram is given. An outline of the operation of the apparatus illustrated at FIG. 5 is as follows.

The components in the Signal Delay and Subtractor boxes, together with the 1-bit extend store, are clocked together by a pulse train occurring at the end of each minor sample interval (= one half of an st sample in length). The train shifts one eight-bit word into, out of or through each block involved. At any one time sixteen words, each representing a signal amplitude, are stored in the delay register. The oldest is shifted out each time to enter the subtractor.

When an R wave is detected and the beta time delay has elapsed, the contents of the accumulator register are circulated through its assoicated adder to add in the next two differences produced by the subtractor. Since each represents one half of a sample time, together they allow one to obtain the average over the whole interval. The extend store expands the 8-bit differences to 16-bit length.

When the preset number of samples have been accumulated, a suitably scaled copy of the result is shifted into the output holding register, and the accumulator is cleared to accept the next group of samples for averaging.

The control and shift pulses are arranged to implicitly accomplish several functions. The subtractor's carry save is preset for each minor sample interval so that addition of the inverted delayed signal is equivalent to subtraction. Pulses which clock the output holding register are delayed to accomplish a division by the appropriate power of two. The accumulation of two half-length minor samples serves to reduce sampling time jitter. The divisor is chosen a factor of two larger than otherwise required in order to properly average them.

The analog-to-digital converter is of a conventional dual-ramp type, chosen for its differential linearity and insensitivity to system clock rate. Two integrators are used alternately to give 100% aperture fraction.

The delay shift register is a conventional MOS type whose total signal delay is proportional to the average clock period. The R wave detector may be of any standard type.

The timing and sequencing circuits together with the block marked System Clock include the control circuitry which generates the required timing pulses and control waveforms.

The versatility of the apparatus will further be apparent. Thus, variation in the time delay alpha would be employed if other segments of the pattern are to be brought into coincidence. Comparison between corresponding segments of different EKG patterns, i.e., different heartbeats, may also be effected by making the time delay, alpha, greater than the time required for one heartbeat.

What is claimed is:

1. An apparatus for determining ST depression EKG signals, including,
   a. means for detecting and amplifying signals, such as EKG waves having R-spikes,
   b. means for continuously delaying the amplified signals for a desired length of time to thereby produce a delayed set of signals,
   c. means for subtracting electrical potentials,
   d. means for continuously feeding said delayed signals into said subtractor means,
   e. means for simultaneously feeding undelayed, amplified signals, corresponding to the same signals as those delayed, into said subtractor means,
   f. means for detecting relatively large, rapid potential changes within the signals, such as caused by R-spikes,
   g. means for obtaining the difference between the delayed and undelayed signals a predetermined time after such potential changes and for continuing the subtraction a predetermined duration,
   h. whereby portions of EKG signals which occur both before and after R-spikes may be compared.

2. The apparatus of claim 1 including
   a. means for translating signals corresponding to EKG waves from analog to digital form immediately after they are detected and amplified.

3. A method of determining ST depression in EKG signals, including the steps of,
   a. detecting and amplifying signals, such as to EKG waves,
   b. continuously dividing said signals into two signal sets,
   c. continuously delaying one of said two signal sets relative to the other signal set, to thereby obtain two identical sets differing from each other only in time,
   d. detecting relatively large, rapid potential changes in one of said signal sets, such as caused by R-spikes in EKG waves,
   e. obtaining the result of subtracting one of the said signal sets from the other set a predetermined time after such relatively large, rapid potential changes, f. continuing said subtraction for a predetermined duration, g. whereby portions of EKG signals which occur both before and after R-spikes may be compared.

4. The method of claim 3 including the additional step of, a. converting signals corresponding to EKG waves from information in analog form to information in digital form immediately after they are detected and amplified.

5. The method of claim 3 wherein the said first and second signal sets are, respectively, portions of different EKG waves.

6. The method of claim 3 wherein the undelayed signal set is detected for relatively large, rapid potential changes.

* * * * *